United States Patent
Taylor et al.

[11] Patent Number: 6,121,586
[45] Date of Patent: Sep. 19, 2000

[54] LIQUID HEATING VESSEL

[75] Inventors: John Crawshaw Taylor, Castletown; Keith Barrie Doyle, Tetbury, both of United Kingdom

[73] Assignee: Strix Limited, United Kingdom

[21] Appl. No.: 09/333,419

[22] Filed: Jun. 15, 1999

Related U.S. Application Data

[63] Continuation of application No. 08/693,218, Dec. 13, 1995, Pat. No. 5,914,063.

[30] Foreign Application Priority Data

| Dec. 13, 1994 | [GB] | United Kingdom | 9425173 |
| Jul. 20, 1995 | [GB] | United Kingdom | 9514858 |
| Oct. 11, 1995 | [GB] | United Kingdom | 9520821 |

[51] Int. Cl.[7] ............... A47J 27/21; H05B 3/06; H05B 3/04
[52] U.S. Cl. ............ 219/438; 219/436; 219/521; 219/536
[58] Field of Search ............... 219/430, 436, 219/438, 439, 521, 536

[56] References Cited

U.S. PATENT DOCUMENTS

| 3,303,327 | 2/1967 | Himelsbaugh | 219/437 |
| 4,310,748 | 1/1982 | Paulin | 219/438 |
| 5,176,856 | 1/1993 | Takashashi et al. | 392/441 |
| 5,657,532 | 8/1997 | Alexander et al. | 219/457 |
| 5,702,623 | 12/1997 | Sharples | 219/436 |

FOREIGN PATENT DOCUMENTS

| 1202659 | 4/1986 | Canada. |
| 0285839 | 10/1988 | European Pat. Off. ......... A47J 27/21 |
| 0491605A1 | 6/1992 | European Pat. Off. ......... A47J 27/21 |
| 574310 | 12/1993 | European Pat. Off. . |
| 4338470 | 11/1994 | Germany. |

*Primary Examiner*—Joseph Pelham
*Attorney, Agent, or Firm*—Testa, Hurwitz & Thibeault LLP

[57] ABSTRACT

The base (10) of a plastics liquid heating vessel (2) is formed by a heated stainless steel plate having a peripheral channel (16) engaging over a bead (32) lower end portion (22) of the vessel wall. A silicone rubber sealing ring (19) is clamped between two vessel wall and the channel.

15 Claims, 4 Drawing Sheets

LIQUID HEATING VESSEL

RELATED APPLICATIONS

This application is a continuation of U.S. Ser. No. 08/693,218, filed Dec. 13, 1995, now U.S. Pat. No. 5,914,063, which is a national stage application of International Application no. PCT/GB95/02910, filed Dec. 13, 1995, which claims priority to Great Britain application nos. 9425173.3, filed Dec. 13, 1994, 9514858.1, filed Jul. 20, 1995, and 9520821.1, filed Oct. 11, 1995.

The present invention relates to liquid heating vessels, and in particular to liquid heating vessels in which an electric heating element is mounted to or provided on the underside of a metallic vessel base.

Whereas in the United Kingdom, water heating vessels such as kettles and jugs have traditionally been provided with immersion heaters extending into the lower part of the vessel to heat the liquid therein, in Europe, the market has been more for vessels having underfloor heating elements. Particularly the vessels have a smooth inside, and are of a corrosion resistant metal such as stainless steel. Such arrangements have the advantage that the inside of the vessel may be easily cleaned after use. However, the cost of manufacturing a heating vessel completely in stainless steel is very high.

To reduce costs, it has been proposed to mount a metallic heating plate in the base of a plastics walled vessel. Whilst this does considerably reduce costs, there are problems associated with mounting a hot metallic plate to a plastics vessel wall, in particular in relation to providing a satisfactory seal between the two components.

The present invention seeks to overcome this problem, and from a first aspect provides a liquid heating vessel comprising a plastics wall and a heated metallic plate forming at least a part of the base of said vessel, said plate having a peripheral channel grippingly receiving a depending portion of the vessel wall, and sealing means arranged and clamped between a wall of said channel and said depending portion of the vessel wall.

The invention also extends to a metallic plate forming or for forming at least a part of the base of a liquid heating vessel comprising an upwardly open peripheral channel to receive a depending edge of a wall of said vessel.

With an arrangement in accordance with the invention, the depending portion of the vessel wall is clamped between the respective side faces of the channel, so as to compress the plastics material, preventing thermal tensile creep. Furthermore, the sealing means acts not only to provide a water-tight seal between the base and the vessel wall, but also acts to further thermally insulate the plastics material of the vessel wall from the base and to provide a resilient clamping force on the vessel wall.

The plastics vessel wall may be the side wall of the vessel in which case the channel may engage over the lower edge of the wall. However, the outer wall may also extend inwardly to constitute part of the base of the vessel as well. In this case a lip or the like may depend from the radially inner periphery portion of the base portion of the vessel wall for engagement with the channel of the metallic plate. Such arrangements have the advantage of cost reduction, since the amount of metal required in forming the base of the vessel is reduced.

Preferably, the metallic plate is of a relatively low thermal conductivity and, most preferably is of stainless steel. This has the advantage of reducing thermal conduction radially outwardly through the base, thereby avoiding overheating, and thus damage to, the lower part of the plastics wall. This is very important, in a dry switch on or boil dry situation, since a plastics material such as polypropylene, which may be used for the vessel wall, will melt at about 140° C., while the element may reach a temperature several hundred degrees higher.

To reduce radial thermal conduction further, one or more circumferential grooves or other formations which locally reduce the plate thickness may be provided in the base between the element and the wall. This reduces the cross-sectional area of the base through which heat may flow radially, effectively 'choking' the flow of heat radially outwardly from the element.

From a yet further broad aspect, therefore, the invention provides a liquid heating vessel comprising a plastics wall portion, a metallic plate having an electric heating element on the underside thereof the plate being mounted, at its periphery, to said plastics wall portion, means being provided on the plate between the element and the vessel wall to restrict the flow of heat from the element to the vessel wall.

The radially outer lower edge of the depending portion plastics wall may have a bead, around which the outer limb of the plate channel can be rolled or crimped to mount the base plate in position.

The lower wall part may also be formed with means, such as a shoulder, to locate the sealing means and to prevent it being extruded out of the channel during assembly.

The sealing means may comprise a sealing ring, for example of silicone rubber. This material is particularly preferred since typically it is stable up to temperatures of 250° C. and will therefore be resistant to overheating of the metallic base should that occur.

The seal may be rectangular in section, similar to a rubber band, so as more easily to locate in the channel. Most preferably, the seal has a diameter which is less than the internal diameter of the channel and is stretched as it engages in the channel. It has been found particularly advantageous in this respect if the cross sectional dimension of the seal in a direction along the base is greater than that in a direction perpendicular to the base, i.e. if the seal is wider in section than it is deep. Typically, a ring may have a an internal diameter of say 110 mm, an external diameter of 120 mm and a thickness of 1.0 mm and may engage in a channel with an internal diameter of 125 mm.

In fitting such a seal, it has been found that when the inner edge of the seal is stretched over the lip of the channel, the rest of the seal rotates through 90° to lie against the inner wall of the channel. It has also been found that it assumes a tapered shape from the top of the channel down into the channel thereby facilitating assembly of the base to the vessel wall. There is a significant cost advantage in using such seals as described above compared to say circular section 'O' rings or bands which are deeper than they are wide in section, since they are easier and thus less expensive to manufacture.

The peripheral channel may have a continuous outer wall for engagement with the vessel wall. Preferably, however, the outer wall of the channel is formed with a series of axially extending slots so as to defined a plurality of tabs for engagement with the vessel wall. The tabs may be formed so as to clip over the lower portion of the vessel wall during assembly, or to engage the vessel wall loosely and then be rolled or crimped onto the wall.

The advantage of such a system is that it will allow the base to be removed relatively easily from the vessel wall and, if required replaced. This would be considerably more difficult with a continuous channel wall.

The base plate of the vessel is heated by a heating element mounted or provided thereon. The element may for example be a metal sheathed heating element which is mounted directly to the plate or to a diffusion member attached to the plate.

However the element may also be a so-called printed heating element mounted on or applied to the plate. Such elements typically comprise a resistive heating track laid down (for example by printing or flame spraying) on an insulating glass, ceramic or glass ceramic substrate itself provided on the plate. In the production of printed elements, the insulating substrate is first laid down on the base in a number of printing and firing operations, and the resistive track then typically, silk screen printed on the layer and fired. Accordingly, to allow access to the base for the screen printer, it would be desirable to have the deposition surface standing proud from the channel. Preferably therefore, the plate has a surface portion radially inwardly of the channel for receiving a heating element and which projects beyond the base of the channel. This allows access to the surface for printing the element without interference from the peripheral channel.

The radially inner wall of the channel may be joined to the projecting surface portion by an inwardly sloping wall, so that the inner portion of the base resembles a dish. This arrangement not only acts to strengthen the base (which means that a thinner gauge of base material may be used) but also increases the length of the thermal path to the vessel wall. Alternatively, to reduce the diameter of the base, the surface portion may be joined to the channel portion by a wall extending substantially parallel to the axis of the base. In such a case, the projecting surface portion may project by a greater amount below the channel base, so as to provide a longer thermal path to the channel.

As stated above, the thickness of the base plate material used may be reduced by providing peripheral strengthening. In plate heaters of the type discussed above comprising a resistive heating track laid down on an insulating layer provided on a metallic plate, the plate thickness is usually of the order of 1.5 mm. The plate has to be that thick in order to resist buckling forces induced during operation by the different coefficients of expansion of the plate and the insulation layer. However with peripheral strengthening, the plate thickness may be reduced to less than 1 mm.

From a further aspect, therefore, the invention provides a plate heater comprising a metallic plate having an electrically insulating substrate provided on a surface thereof and an electrical resistive heating track laid down on said substrate, wherein said plate is provided with stiffening means around its periphery and is less than 1 mm thick.

Preferably the plate is between 0.4 and 0.6 mm and most preferably about 0.5 mm thick.

The stiffening means may comprises a lip raised around the edge of the plate. Most preferably the stiffening means provides a peripheral surface which can make a compression seal with a wall portion of a heating vessel to which it is mounted. For example, as described above, the surface may be formed as part of a channel locating over a depending wall of the vessel.

The reduction in thickness of the plate material also has the advantage that the heat transfer through the plate to the liquid in a vessel is improved. This has the effect that the temperature of the track itself is reduced in normal operation, as heat will be more efficiently conducted away from it to the liquid. Indeed with S430 stainless steel having a 0.1 mm thick insulating layer, with an element watts density of 70 Wcm$^{-2}$, it has been calculated that when the liquid in the vessel boils, with a plate thickness of 1.5 mm, the temperature drop through the plate and layer from the element is about 80° C. With a thickness of 0.5 mm, however, that is reduced to about 50° C. Accordingly, when liquid in the vessel is boiling at 100° C., the track temperature with the thinner plate material will be 150° C. as opposed to 180° C., a very significant reduction.

The reduction in track temperature can be put to good advantage in a number of ways. Firstly, it is possible, for a given maximum permissible track temperature, to increase the watts density of the element, and thus decrease its size and diameter. This represents a cost saving in that a smaller amount of relatively expensive plate material and insulating materials may be used. Furthermore, the smaller the plate diameter the stronger it will be, so that a further reduction in thickness may be possible.

To achieve minimum plate diameter, the track is preferably generally spiral in shape or has one or more spiral portions, since this will allow a large number of turns of element track to be accommodated without regions of low radius which would act to provide current concentrations and thus local overheating.

This is believed to be a novel arrangement in itself, and from a yet further aspect, therefore, the invention provides a plater heater comprising a metallic plate having an electrically insulating substrate provided on a surface thereof and an electrical resistive heating track laid down on said substrate, said plate being less than 1 mm thick and said track being generally spiral in form.

Preferably the turns of the spiral are less than 1 mm apart. This is made possible because the potential drop between adjacent turns is relatively low.

This aspect of the invention is not limited to the use of circular spiral tracks, and the track could have a rectangular, triangular or other polygonal or curved spiral shape. For example if the track were applied to a rectangular plate, in order to fill the corner regions of the plate, a rectangular spiral would be appropriate. It should also be recognised therefore that the invention is not limited to circular plates, but to any desired shape of plate.

A further advantage of the lower track temperature is that it permits the use of track materials which are resistant to oxidation at lower temperatures and which can therefore dispense with the overglaze which is normally provided to protect the track material from oxidation.

This is a novel arrangement in itself, and from a yet further aspect, therefore, the invention provides a plate heater comprising a metallic plate having an electrically insulating substrate provided on a surface thereof and an electrical resistive heating track laid down on said substrate, the heater track being substantially exposed and of a material which is resistant to oxidation.

Examples of such track materials would be nickel or high nickel alloys which are resistant to oxidation at temperatures below at least 250° C. Furthermore, if the track material has a sufficiently low resistance, then it would be possible to use the track material itself to make electrical contact with a supply rather than have low-resistance contact pads as are usually provided.

The preferred track material is nickel since it is inexpensive, has a positive temperature coefficient of resistance (which means that it will to some extent limit overheating in the event of the vessel boiling dry or being switched on dry) and is highly resistant to oxidation.

It is normal in liquid heating vessels with metallic bases to earth the base through an earth connection. However, this means that additional electrical connections have to be made to the base plate, and also an earth connector needs to be provided in the electrical supply to the vessel. This is expensive. From a yet further aspect, therefore, the invention seeks to overcome this problem by providing an electrically heated base in or for a liquid heating vessel which is electrically insulated on its liquid-facing side.

Preferably the insulation is provided by a fired glass, ceramic or glass ceramic coating. Such coatings are well known in the art as being used to insulate resistive heating tracks on the under-side of the base.

The thickness and porosity of the insulating layer should be sufficient to provide satisfactory insulation during operation. Typically the thickness may be at least 1 mm and the porosity and thickness sufficient to resist a flash test of over 2500 V.

Some preferred embodiments of the invention will now be described by way of example only with reference to the accompanying drawings in which.

Figure 1:
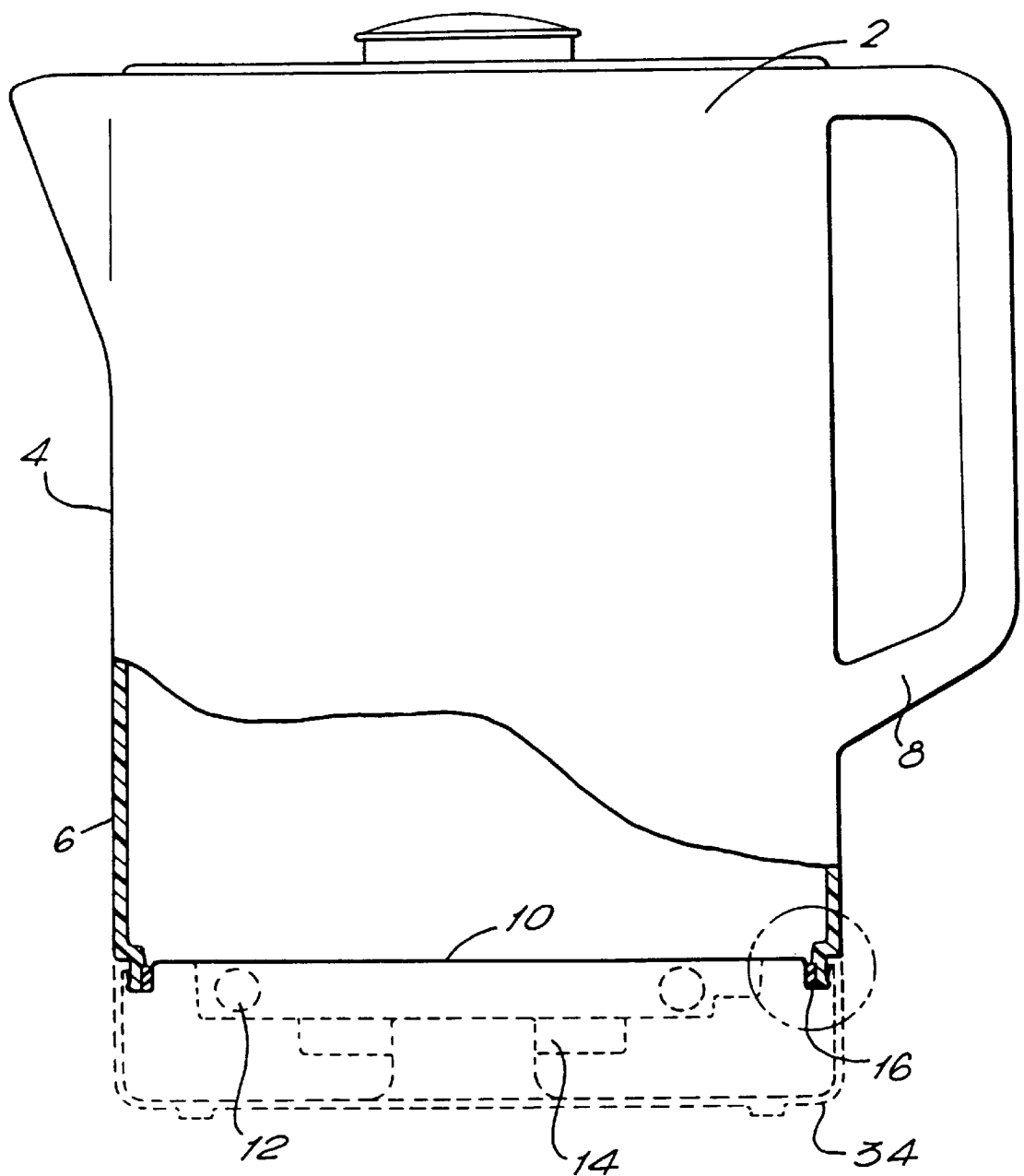
FIG. 1 shows a water heating vessel in accordance with the invention.

With reference to FIG. 1, a water heating vessel 2 has a body 4 which is moulded from polypropylene, so as to have a wall 6 and a handle 8.

The base 10 of the vessel 2 is smooth and is made of 0.4 to 0.6 mm thick stainless steel plate. It is circular and has an electric heating element 12 and thermally sensitive control 14 mounted to its underside. The element 12 is mounted within an aluminium carrier which is attached to the underside of the base 10. The base 10 is also formed with a peripheral U-shaped channel 16. The initial shape of the outer limb 18 of the channel 16 is shown in dotted lines in FIG. 2. A series of three concentric grooves 20 is formed in the underside of the base 10 between the element 12 and the channel 16. Each groove 20 is about 0.2 to 0.3 mm deep and about 0.4 to 0.5 mm wide.

Figure 2:
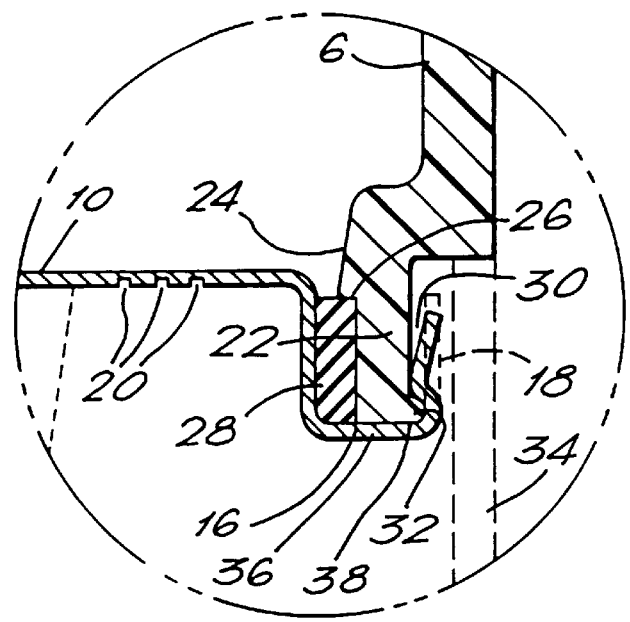
FIG. 2 shows a detail of FIG. 1.

The channel 16 receives the lower end portion 22 of the plastics wall 6. The radially inner wall 24 of the lower end portion 22 is formed with a shoulder 26 which acts to locate a rectangular section silicone rubber sealing ring 28. The radially outer wall 30 of the lower end portion 22 is formed with a bead 32 over which the outer limb 18 of the channel 16 may be rolled, as shown in FIG. 2.

The lower end portion 22 of the wall 6 is itself stepped inwardly, so as to allow a base cover 34 to lie flush with the wall 6.

The vessel base is assembled as follows. Firstly, the sealing ring 28 is stretched over the lower end portion 22 of the wall 6, and located against the shoulder 26. A lubricant is then applied over the inner and outer walls of the lower end portion 22 and channel 16 of the base 10 pushed over the end portion 22, until the base 36 of the channel 16 abuts on the lower edge 38 of the wall 6. The seal 28 is prevented from being pushed into the vessel by the shoulder 26. When the base is in position, the outer limb 18 of the channel 16 is then rolled over the bead 32 to clamp the lower end portion 22 of the wall between it and the seal 28. This exerts a compressive force on the thickness of the wall 6, thereby minimising thermal creep.

The lower end portion 22 of the wall 6 is also insulated thermally from the element 12 by the base 10 itself which is of stainless steel which has a relatively low thermal conductivity, by the grooves 20 which impede the flow of heat radially outwardly from the element, and by the sealing ring 28.

A potential problem may arise with the base construction as shown in FIGS. 1 and 2 when the heating means provided on the base comprises a printed heating element. In the construction of such elements, it is advantageous to have unobstructed access to the surface for the deposition of the element, for example to allow the surface to be silk screen printed with the desired element track. In such a case, the peripheral channel 16 may get in the way.

Figure 3:
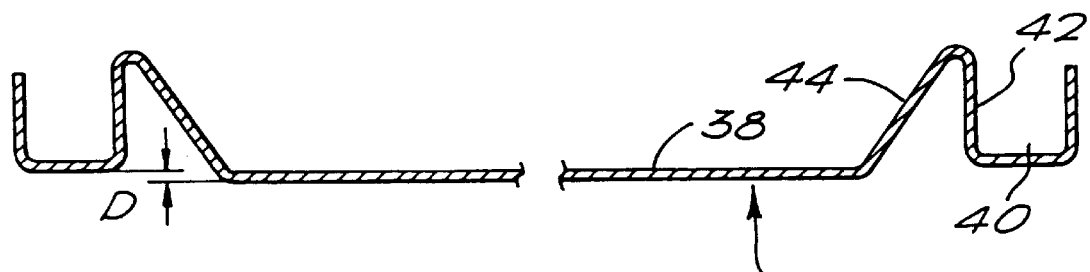
FIG. 3 shows a modified form of base in accordance with the invention.

The modified base 36 shown in FIG. 3 overcomes this problem by having its central surface portion 38 offset from the base of the peripheral mounting channel 40 so as to project by a distance D therebelow. The offset D need not be large, for example it need only be in the region of 0.5 mm. The central surface portion is connected with the upper end of the inner channel wall 42 by a sloping portion 44. This acts both to strengthen the base and also to increase the length of the thermal path to the wall of the vessel.

Figure 4:
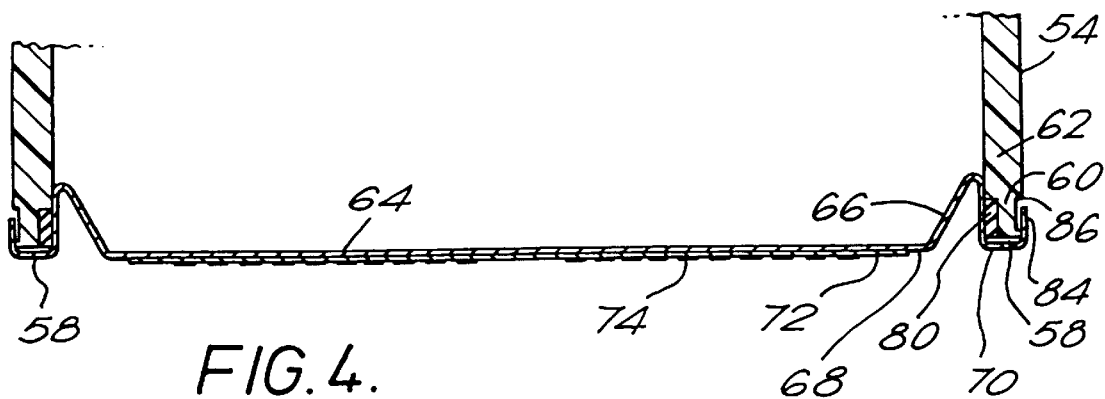
FIG. 4 shows a section through the base of a vessel embodying the invention.
Figure 5:
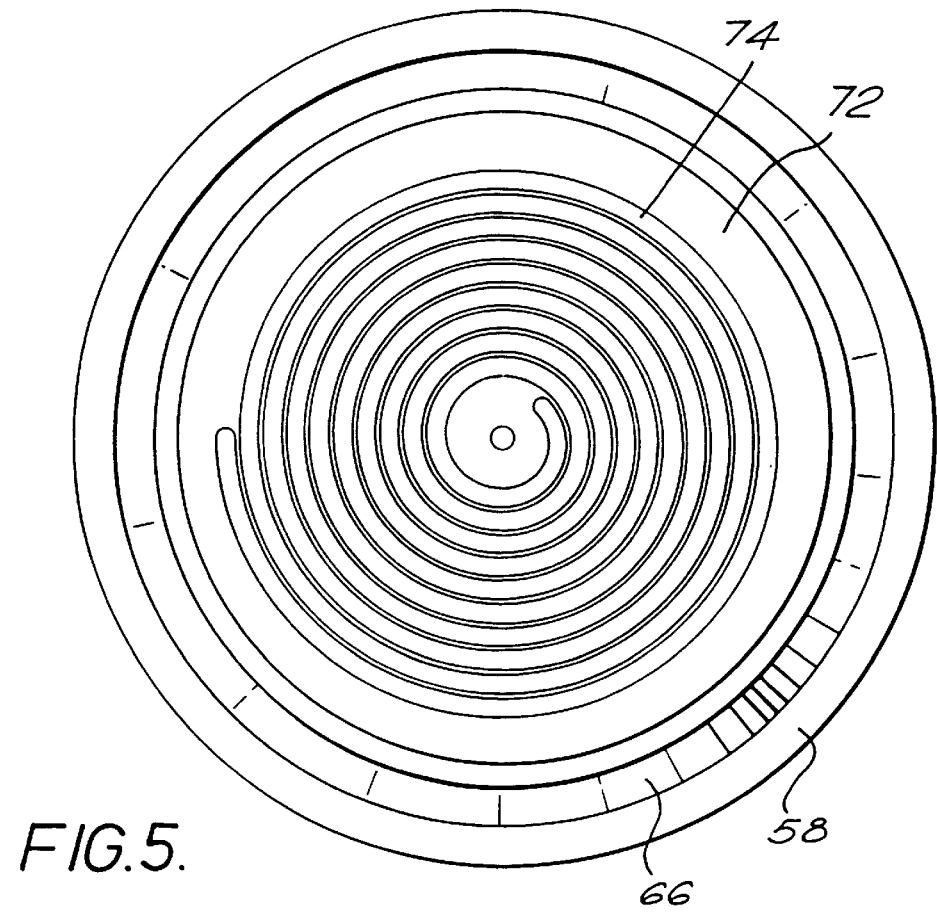
FIG. 5 shows bottom plan view of FIG. 4.

FIGS. 4 and 5 show a base 50 of the type described in FIG. 3 printed with a heating track 52 and installed on the base of a liquid heating vessel 54.

The base 50 comprises a stainless steel plate 56, 0.5 mm thick which is formed with a peripheral channel 58 for engagement over the lower end 60 of the plastics wall 62 of the vessel. The central region 64 of the plate 56 is joined to the channel 58 by an inclined section 66 which strengthens the central region 64 of the plate against buckling forces it will experience in use.

The lower surface 68 of the central region 64 offset below the bottom surface 70 of the channel 58, by, for example a distance of 0.1 to 0.5 mm.

The lower surface 68 is provided with an insulating layer 72 of glass ceramic approximately 0.1 mm thick laid down by any suitable technique, for example by printing and firing. The offset of the lower surface 68 from the channel base 70 allows clear access to the surface for that purpose.

On top of the insulating layer 72 is laid down a spiral heating track 74. The track 74 is preferably laid down by silk screen printing which again is facilitated by the offset of the surface 68 from the claimed base 70.

The track 74 is approximately 2.5 mm wide and the turns of the track are separated by a distance of about 0.5 to 1 mm. A gap of 4 mm to the outside of the insulating layer 72 is required to meet safety standards. A spiral pattern means that a greater length of track may be accommodated on a smaller diameter substrate, thereby reducing the size of the heater.

The track material is nickel or a high nickel alloy which is resistant to oxidation at the normal working temperatures of the track, that is usually less than 250° C. Being resistant to oxidation, the track does not need a protective overglaze as is usually provided in such heaters, thereby reducing the number of production steps and thus cost. Furthermore, nickel and high nickel alloys have a sufficient low resistance to allow an electrical contact to be made directly to the track 74 rather than providing a separate low resistivity contact pad of, for example silver. Thus again reducing production costs. The plate 64 is mounted to the lower edge of the vessel wall 62 in the same manner as in the previous embodiment, with a compression seal 30 being arranged between the inner channel wall 82 and the vessel wall 62. The outer channel wall 84 is deformed into a recess 86 in the vessel 62 wall to retain the plate in position.

Figure 6:
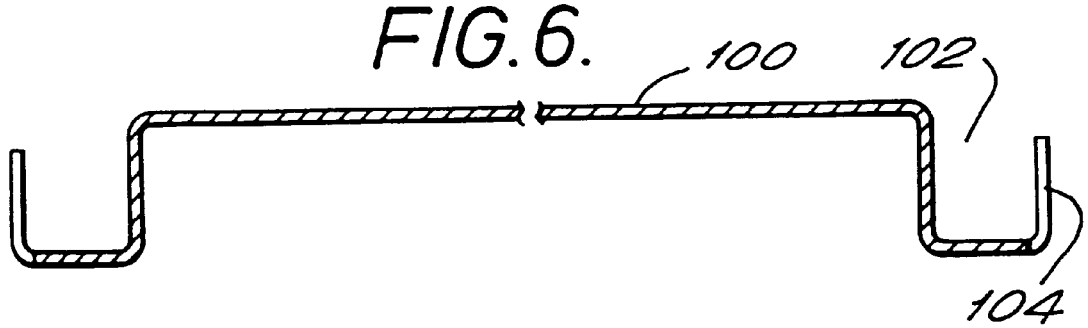
FIG. 6 shows a further modification of the base of the vessel FIG. 1 in section.
Figure 7:
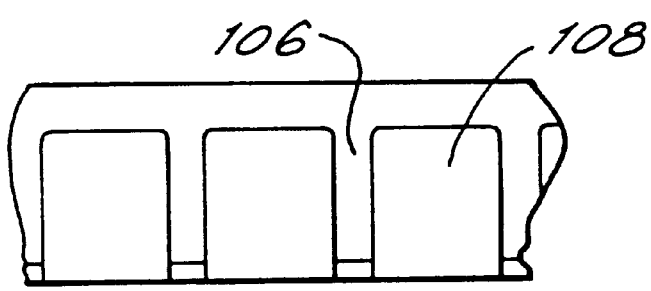
FIG. 7 shows a partial side view of the base of FIG. 6.

Turning now to FIGS. 5 and 6, a circular base 100 has a peripheral channel 102 for engaging the lower edge of the plastics vessel wall, as in the earlier embodiments described above. In this embodiment, however, the outer wall 104 of the channel 102 is formed with a series of equispaced axially extending slots 106 so as to define a series of tabs 108 equispaced around the periphery of the channel 102. Typically the slots 106 may be 1 mm wide and the tabs 108 4 mm wide.

The base 100 may be assembled to the lower edge of the vessel wall, in the same way as described earlier, the tabs 108 being rolled over the bottom edge of the vessel wall. However, the tabs 108 will allow the base more easily to be removed from the vessel wall, for example if repair is required. The base 50 may then be re-mounted on the vessel wall in the same way as mentioned above, or, if the tabs have deflected resiliently inwardly to a diameter smaller than the outer diameter of the cooperating part of the vessel wall, by being snap-fitted onto that part of the vessel wall.

Figure 8:
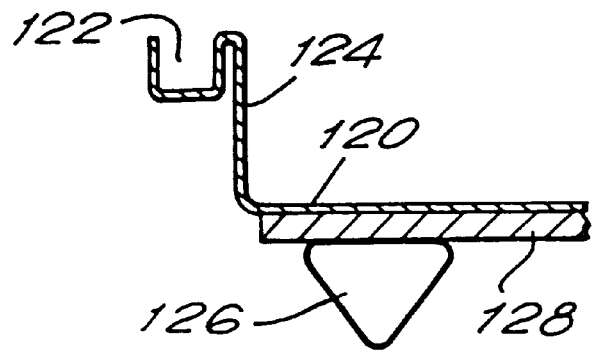
FIG. 8 shows a further embodiment of the invention.

FIG. 8 shows a modified version of a heater in accordance with the invention, with a central portion of the base being offset from the peripheral channel 120 by a portion 124 extending generally parallel to the axis of the base. This acts to increase the length of the thermal path to the peripheral channel 122 from the element 126 (shown in this embodiment as being mounted to a diffusion plate 128 mounted to the vessel base in a conventional manner), while at the same time allowing the diameter of the base to be reduced.

In the particular arrangements described above, the plate heaters have been fitted to the bottom edge of the outer vessel wall. It will be appreciated, however that because of the reduction in heater sizes which the invention makes possible, part of the vessel base may also be formed of plastics, and the heater mounted to a depending inner edge of the plastics base portion. Such arrangements are thus also intended to fall within the scope of the invention.

It will also be appreciated that whilst a circular plate and a generally circular spiral track shape have been disclosed in the preferred embodiments, the invention is not limited to such and is intended to encompass other shapes of plate and element track, for example rectangular plates and spirals. Furthermore, not the entire length of the track need be spiral to enjoy the benefits of the invention, and tracks having spiral portions are therefore also intended to be included within the scope of the invention.

What is claimed is:

1. A plate heater including a metallic plate, the metallic plate comprising:
    a generally planar central region with an upper side and an underside;
    an electric heating element on the underside;
    an upwardly extending wall joined to the generally planar central region;
    a raised lip extending around the metallic plate and joined to the upwardly extending wall; and
    a circumferential wall portion depending downwardly from the raised lip without projecting below the level of the generally planar central region.

2. The plate heater of claim 1, wherein the upwardly extending wall is inclined outwardly.

3. The plate heater of claim 1, wherein said upwardly extending wall is generally perpendicular to the generally planar central region.

4. The plate heater of claim 1, 2, or 3, wherein the electrical heating element comprises an electrically insulating substrate with an electrically resistive heating track being laid down on the substrate.

5. The plate heater of claim 1, 2, or 3, wherein the electrical heating element comprises a sheathed heating element mounted to the generally planar central region of the plate.

6. The plate heater of claim 1, 2, or 3, wherein the plate has a thickness of less than 1 mm.

7. The plate heater of claim 6, wherein the thickness is between about 0.4 mm and about 0.6 mm.

8. The plate heater of claim 7, wherein the thickness is approximately 0.5 mm.

9. The plate heater of claim 1, wherein the plate is stainless steel.

10. The plate heater of claim 1, wherein the downwardly depending wall portion forms a wall of a channel for locating over a depending wall section of a liquid heating vessel for mounting the heater to the vessel.

11. The plate heater of claim 9, wherein the outer wall of the channel is formed with a series of axially extending slots that define a plurality of tabs for engagement with the vessel wall.

12. The plate heater of claim 1, wherein the plate has means to restrict the flow of heat outwardly therefrom.

13. The plate heater of claim 1, wherein the upper side of the plate is electrically insulated.

14. An electric liquid heating vessel, comprising:
    a plastic wall;
    a base; and
    a heated metallic plate forming at least a part of the base of the vessel, the plate comprising:
        a generally planar central region with an upper side and an underside;
        an electric heating element on said underside;
        an upwardly extending wall joined to the generally planar central region;
        a raised lip extending around the metallic plate and joined to the upwardly extending wall; and
        a circumferential wall portion depending downwardly from the raised lip without projecting below the level of the generally planar central region.

15. The vessel of claim 14, wherein the downwardly depending wall portion forms a wall of a channel, the channel located over a depending portion of the vessel wall thereby mounting the heater to the vessel.

* * * * *